April 6, 1926.

E. HOLLMIG 1,579,365

AUTOMATIC FUEL SAVER AND AUXILIARY AIR REGULATOR

Filed May 1, 1925

Inventor.
Emil Hollmig
by J. Daniel Stowe
Attorney.

Patented Apr. 6, 1926.

1,579,365

UNITED STATES PATENT OFFICE.

EMIL HOLLMIG, OF CHICAGO, ILLINOIS, ASSIGNOR, BY MESNE ASSIGNMENTS, TO THE KLEIN MANUFACTURING COMPANY, OF CHICAGO, ILLINOIS, A CORPORATION OF DELAWARE.

AUTOMATIC FUEL SAVER AND AUXILIARY AIR REGULATOR.

Application filed May 1, 1925. Serial No. 27,231.

*To all whom it may concern:*

Be it known that I, EMIL HOLLMIG, a citizen of the Republic of Germany, and a resident of the city of Chicago, county of Cook, and State of Illinois, have invented a new and useful Automatic Fuel Saver and Auxiliary Air Regulator, of which the following is a specification.

My invention pertains to a new and useful automatic fuel saver and auxiliary air regulator, and the device is particularly adapted for use with an internal combustion engine, being connected with the intake manifold of the engine.

The main object of the invention is to provide a fuel saving device in the form of an auxiliary air feeding and regulating device which acts entirely automatically and supplies additional air to the fuel mixture during the passage thereof from the carburetor through the intake manifold to the engine, and which device supplies such additional or auxiliary air in regulated quantities and in accordance with the actual requirements, supplying a larger amount of air with a rich fuel mixture and a slight amount or none whatever with a leaner fuel mixture.

Another object is to provide such a fuel saving device with means for adding the air in a fine spray into the fuel mixture as it passes to the engine.

Another object is to provide such a device which is automatically actuated by the fuel itself during its passage from the carburetor to the intake manifold.

And another object is to provide the device with means for accurately regulating the same so that it will feed the exact amount of air suitable for the particular richness of the fuel mixture and for the particular construction and power of the engine.

Other objects and advantages are attained with my invention, one form of which is described in the present specification and illustrated in the accompanying drawings, in which.

Figure 1:
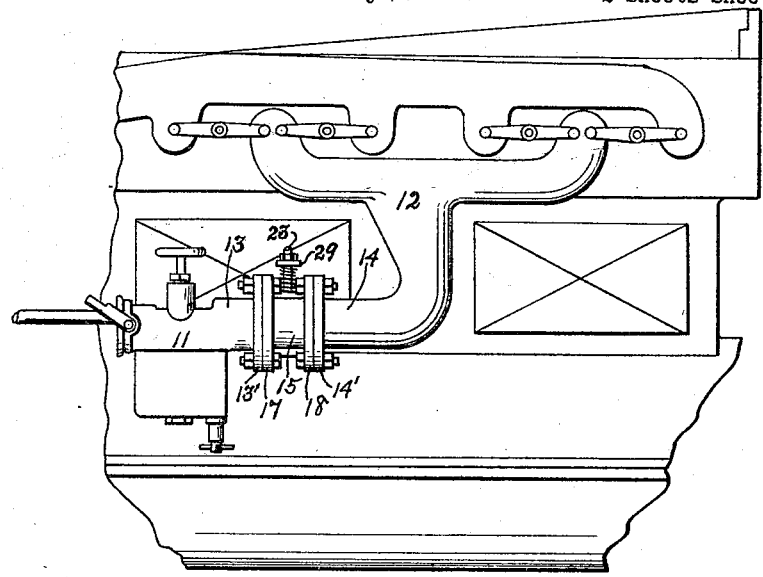
Fig. 1 is an elevational view illustrating my invention mounted in position between the carburetor and the intake manifold of the internal combustion engine of an automobile.
Figure 2:
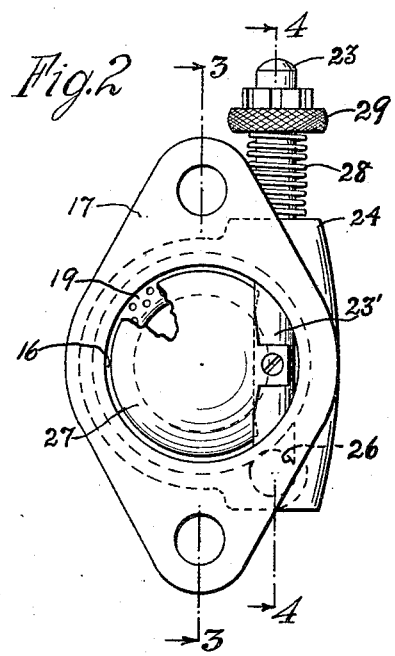
Fig. 2 is an elevational view of the device.
Figure 3:
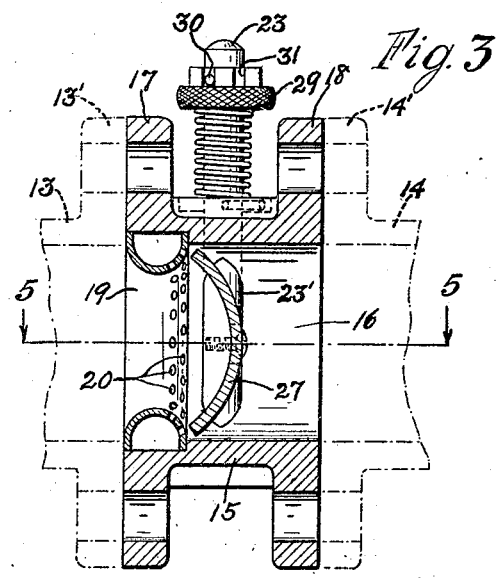
Fig. 3 is a vertical sectional view, taken on line 3—3 of Fig. 2.
Figure 4:
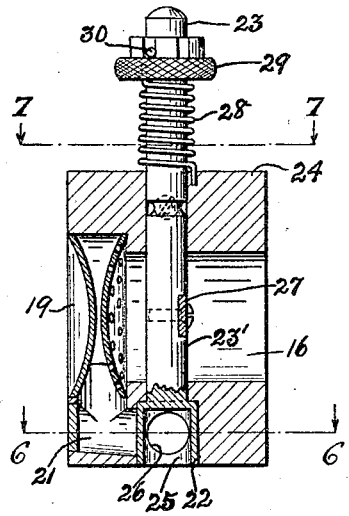
Fig. 4 is a vertical sectional view through the valve stem, taken on line 4—4 of Fig. 2.
Figure 5:
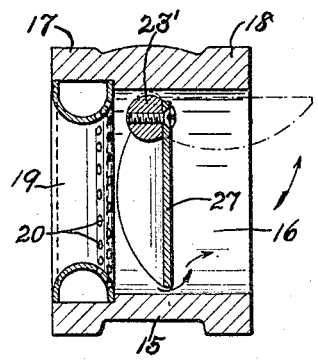
Fig. 5 is a horizontal sectional view of the device taken on line 5—5 of Fig. 3.
Figure 6:
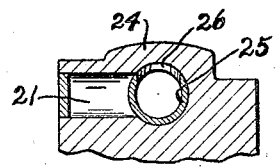
Fig. 6 is a horizontal sectional view through the inlet valve, taken on line 6—6 of Fig. 4.
Figure 8:
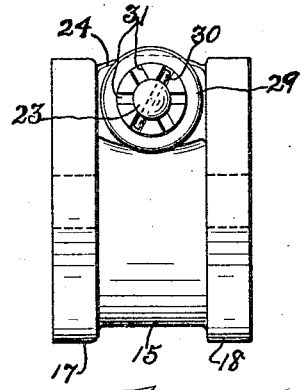
Fig. 8 is a plan view of my automatic fuel saver and auxiliary air regulator, particularly arranged in the present form for conveniently mounting it between the usual connected flanges provided on the conduit parts of the carburetor and the intake manifold of an automobile engine, as shown in Fig. 1.
Figure 7:
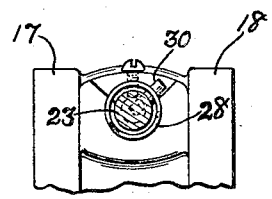
Fig. 7 is a fragmentary plan view, partly in section, taken on line 7—7 of Fig. 4.

In the drawings I have illustrated one form of my invention and have shown it connected with the engine by inserting it between the carburetor 11 and the intake manifold 12 of the engine, the device being fastened to the conduit parts 13 and 14 connected respectively with said carburetor and intake manifold.

The particular form of my invention illustrated comprises a substantially cylindrical member or casing 15 which forms a fuel channel 16 for the passage of the fuel mixture therethrough, from the carburetor 11 to the intake manifold 12; and this casing is provided with cylindrical flanges 17 and 18 for attachment to the corresponding flanges 13' and 14' of the conduit parts 13 and 14.

The air delivering and feeding means preferably comprises a semi-annular air feeding member 19 which is mounted in an enlarged annular seat at one end of channel 16, and is provided with perforations 20 which are directed so as to feed the air in a fine spray into the channel 16 and thus to thoroughly mingle with the fuel mixture passing through the channel. A longitudinal bore 21 in the casing communicates with the air feeding member 19 and with a transverse bore 22 which opens through the bottom of the casing.

The automatically operating valve means or mechanism comprises a stem 23 which is rotatably mounted in a shoulder portion 24 provided at one side of the casing 15, and has an intermediate portion 23' extending into the channel 16 of the casing. The lower end of this stem is cored out to provide an air receiving space or chamber 25 open at the bottom, and a side opening 26 leads from said chamber and is registrable with the longitudinal bore 21 for admitting air to the perforated feed member 19. A curved valve member or flap 27 is mounted on stem portion 23' with suitable fastening means, and normally extends across the channel 16 when the engine is at rest, said member being slightly smaller than the channel to permit passage of a small quantity of fuel through the channel before the valve mechanism is actuated for the admission of additional air.

Spring means 28 is provided for moving the valve mechanism to the closed position, and for keeping the same closed when the engine is at rest. This spring means is preferably mounted on the upper end of the stem 23, engaging the casing with one end, and having its other end attached to a castellated disc or member 29 which is adjustably mounted on the stem, as by means of a pin 30 placed in a pair of the several slots 31 provided between the castles 31' on said disc, or the disc may be made adjustable in any approved manner. This spring can thereby be adjusted or regulated to provide the required tension in order to permit the flap valve 27 to move with the fuel mixture passing through the device and thereby to operate the valve means 25, 26, etc., so as to exactly suit the particular richness of the fuel mixture and the particular size and power of the engine.

With a construction as above disclosed, it is apparent that the device will operate entirely automatically, and that when the engine is running fast and a large amount of fuel is passing through the device, from the carburetor to the intake manifold, that the suction of the engine will be greater, and consequently that the flap 27 will be actuated in accordance and opened to a greater extent, than when the engine is running slowly, and it is evident that the device will thus automatically feed a proper amount of auxiliary and additional air to the fuel mixture during its passage from the carburetor to the intake manifold, and will feed said air in a fine spray thus aiding in fully vaporizing the fuel and producing a proper and economical fuel mixture, thereby greatly eliminating the deposition of carbon.

Although I have illustrated and described my invention in a particular or preferred form, and have mounted it in a preferred position in the conduit between the carburetor and the intake manifold, it should be understood that I contemplate various modifications and changes in the construction and in the positioning of the invention, and desire to include such as properly come within the scope of the annexed claims.

What I claim as my invention and desire to secure by Letters Patent is:

1. An auxiliary air inlet device adapted to admit air to the intake manifold of an internal combustion engine, comprising a body having a cylindrical channel to permit passage of the charge therethrough, an annular U-shaped member projecting into said channel and having perforations in its side to admit air in the direction of flow of the charge, a concave vane pivotally mounted in said channel so as to be acted upon by both the charge and the air admitted through said member, a valve controlled by said vane adapted to admit air to said member, and adjustable resilient means tending to close said valve and hold said vane in a position of maximum obstruction.

2. An auxiliary air inlet device comprising, a body having a cylindrical bore therethrough, an annular tube fitted at one end of said body and partially projecting into its bore, said tube having a plurality of perforations in its side away from said end, a shaft having a hollowed end pivotally mounted in said body at right angles and substantially tangential to the portion of said bore adjacent said tube, a vane secured to said shaft, said vane being concave toward said perforated tube, resilient means tending to maintain said vane adjacent said tube, and valve means operable upon movement of said vane away from said tube to permit passage of air through the hollowed end of said shaft into said perforated tube.

3. An auxiliary air inlet device, comprising a flanged cylindrical body having a central bore therethrough, an annular ring U-shaped in cross-section secured to said body at one end, said ring having its rounded interior surface projecting within said bore and having perforations directed substantially towards the central portion of said bore, a shaft pivotally mounted in the central portion of the body and being hollowed at one end to form a rotatable sleeve valve, means for transmitting air from said valve to said annular ring, a baffle plate secured to said shaft and extending across said bore adjacent said ring, and resilient means tending to hold said baffle in position of maximum obstruction to the passage of a fluid through said bore, and said valve in closed position.

4. A fuel saving device adapted to be connected between the carburetter and intake manifold of an internal combustion engine, comprising a body member having a channel therethrough, an annular U-shaped member set in the channel at the end at which the charge enters, said member partially projecting into said channel so as to form a constricted throat and having air admitting perforations in its side, a vane pivotally mounted within said channel concave toward said member and adjacent thereto, resilient means urging said vane toward said member to partially close said channel, a valve adapted to admit air to said member, and means controlled by the movement of said vane to operate said valve.

In testimony whereof I have signed my name to this specification.

EMIL HOLLMIG.